United States Patent
Paulson

(10) Patent No.: US 10,730,788 B2
(45) Date of Patent: Aug. 4, 2020

(54) PHYSICAL VAPOR DEPOSITED LAYERS FOR PROTECTION OF GLASS SURFACES

(71) Applicant: CORNING INCORPORATED, Corning, NY (US)

(72) Inventor: Charles Andrew Paulson, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 234 days.

(21) Appl. No.: 15/681,639

(22) Filed: Aug. 21, 2017

(65) Prior Publication Data
US 2017/0369363 A1 Dec. 28, 2017

Related U.S. Application Data

(62) Division of application No. 14/043,354, filed on Oct. 1, 2013, now Pat. No. 9,751,799.

(60) Provisional application No. 61/709,334, filed on Oct. 3, 2012.

(51) Int. Cl.
*B32B 17/06* (2006.01)
*C03C 17/00* (2006.01)
*C03C 17/22* (2006.01)

(52) U.S. Cl.
CPC ............ *C03C 17/001* (2013.01); *B32B 17/06* (2013.01); *C03C 17/22* (2013.01); *B32B 2307/536* (2013.01); *Y10T 428/24983* (2015.01); *Y10T 428/265* (2015.01); *Y10T 428/266* (2015.01)

(58) Field of Classification Search
CPC . B32B 17/06; B32B 2307/536; C03C 17/001; C03C 17/22; Y10T 428/24983; Y10T 428/265; Y10T 428/266
See application file for complete search history.

(56) References Cited

U.S. PATENT DOCUMENTS

| | | | |
|---|---|---|---|
| 3,743,491 A * | 7/1973 | Poole | C03C 17/23 65/30.14 |
| 3,751,238 A * | 8/1973 | Grego | C03C 21/002 65/30.14 |
| 5,487,920 A | 1/1996 | Lopata et al. | |

(Continued)

FOREIGN PATENT DOCUMENTS

| CN | 1986873 A | 6/2007 |
|---|---|---|
| CN | 201785308 U | 4/2011 |

(Continued)

OTHER PUBLICATIONS

Korean Patent Application No. 20157011554 Office Action dated Oct. 5, 2018; 5 Pages; Korean Patent Office.
(Continued)

*Primary Examiner* — Travis M Figg

(57) ABSTRACT

A scratch-resistant glass substrate is prepared by forming a hard, scratch-resistant layer over a major surface of the substrate. The layer is formed from an inorganic material such as a metal oxide, metal nitride, metal carbide, or metal boride using, for example, physical vapor deposition such as reactive or non-reactive sputtering at a process temperature of less than 500° C. The inorganic layer is resistant to micro-ductile scratching, which can safeguard the visible appearance of the glass substrate in use. The glass substrate can include chemically-strengthened glass.

7 Claims, 5 Drawing Sheets

(56) References Cited

U.S. PATENT DOCUMENTS

| | | | |
|---|---|---|---|
| 5,772,862 A | 6/1998 | Ando et al. | |
| 5,830,332 A * | 11/1998 | Babich | C23C 14/0605 204/192.15 |
| 5,844,225 A | 12/1998 | Kimock et al. | |
| 6,309,901 B1 | 10/2001 | Tahon et al. | |
| 6,572,935 B1 * | 6/2003 | He | C23C 16/26 427/249.7 |
| 6,663,753 B2 * | 12/2003 | Veerasamy | B05D 5/083 204/192.11 |
| 6,768,581 B1 * | 7/2004 | Yip | G02B 1/115 359/355 |
| 6,945,097 B2 * | 9/2005 | Jardret | G01N 3/46 73/799 |
| 7,018,727 B2 * | 3/2006 | Dzick | C03C 17/3417 428/699 |
| 7,713,638 B2 | 5/2010 | Moelle et al. | |
| 8,039,045 B2 | 10/2011 | Tei et al. | |
| 8,153,266 B2 * | 4/2012 | Petrmichl | C03C 17/245 428/432 |
| 2005/0129934 A1 * | 6/2005 | Veerasamy | C03C 17/23 428/336 |
| 2005/0178652 A1 * | 8/2005 | Murphy | C23C 14/58 204/192.11 |
| 2006/0003545 A1 * | 1/2006 | Veerasamy | C03C 17/3435 438/428 |
| 2007/0254164 A1 * | 11/2007 | Veerasamy | C03C 17/36 428/432 |
| 2009/0263667 A1 * | 10/2009 | Veerasamy | C03C 17/3435 428/426 |
| 2010/0215950 A1 * | 8/2010 | Schultz | C23C 14/0676 428/336 |
| 2010/0215951 A1 * | 8/2010 | Shibata | C23C 14/0641 428/336 |
| 2011/0151173 A1 | 1/2011 | Florjancic et al. | |
| 2011/0135914 A1 * | 6/2011 | Murphy | C03C 17/3441 428/336 |
| 2012/0045567 A1 * | 2/2012 | Aitken | C23C 14/5806 427/8 |
| 2012/0171444 A1 * | 7/2012 | Haruta | G02B 1/105 428/217 |

FOREIGN PATENT DOCUMENTS

| | | | |
|---|---|---|---|
| CN | 102529209 A | 7/2012 | |
| EP | 0421075 A1 * | 4/1991 | C23C 16/0227 |
| EP | 700879 B1 | 8/1998 | |
| EP | 992464 A1 | 4/2000 | |
| EP | 757020 B1 | 6/2001 | |
| EP | 1885658 B1 | 1/2010 | |
| EP | 939747 B1 | 1/2011 | |
| EP | 2363383 A1 | 9/2011 | |
| EP | 2410073 A1 | 1/2012 | |
| EP | 2492090 A1 | 8/2012 | |
| JP | 05032431 A | 2/1993 | |
| JP | 08119675 A | 5/1996 | |
| JP | 09208264 A | 8/1997 | |
| JP | 2001176056 A | 6/2001 | |
| JP | 2005187239 A | 7/2005 | |
| JP | 2005190700 A | 7/2005 | |
| JP | 2012022200 A | 2/2012 | |
| JP | 2012123353 A | 6/2012 | |
| KR | 2009042479 A | 4/2009 | |
| WO | 1999001589 A1 | 1/1999 | |
| WO | 2000055655 A1 | 9/2000 | |
| WO | 2006057829 A2 | 6/2006 | |
| WO | 2008007180 A1 | 1/2008 | |
| WO | 2010072784 A1 | 7/2010 | |

OTHER PUBLICATIONS

English Translation of JP2015535730 Office Actioon dated Aug. 29, 2017, Japan Patent Office.

CN201380052140.7 English Translation of the First Office Action dated May 10, 2016, China Patent Office.

International Search Report and Written Opinion of the International Searching Authority; PCT/US2013/062825; dated Jan. 3, 2014; 10 Pages; European Patent Office.

Mao et al; "Nanoscale Elastic-Plastic Deformation and Stress Distributions of the C Plane of Sapphire Single Crystal During Nanoindentation"; Journal of the European Ceramic Society, 31, (2011), 1865-1871.

Merriam-Webster Definition of "Water-Clear".

Sumant et al; "Fabrication of MEMS Components Based on Ultrananocrystalline Diamond Thin Films and Characterization of Mechanical Properties"; Mat. Res. Soc. Symp. Proc. vol. 657, 2001; 6 Pages.

Tunal et al. "High quality ITO thin films grown by dc and RF sputtering without oxygen", J. Phys. D: Appl. Phys. 43 (2010).

TW102135384 Search Report dated Oct. 31, 2016, Taiwan Patent Office.

Zhuang Jin-dong and Tsai Fa-da., "Mechanical Properties of ITO Thin Films by Nanoindentation", Seminar on Precision Detection and Nanotechnology, Dec. 1, 2006.

Korean Patent Application No. 20157011554 Notice of Allowance dated Jul. 19, 2019, Korea Patent Office, 1 Pgs.

\* cited by examiner

PHYSICAL VAPOR DEPOSITED LAYERS FOR PROTECTION OF GLASS SURFACES

CROSS-REFERENCE TO RELATED APPLICATIONS

This application is a divisional application and claims the benefit of priority under 35 U.S.C. § 120 of U.S. patent application Ser. No. 14/043,354, filed on Oct. 1, 2013, which in turn, claims the benefit of priority under 35 U.S.C. § 119 of U.S. Provisional Application Ser. No. 61/709,334 filed on Oct. 3, 2012, the contents of each of which are relied upon and incorporated herein by reference in their entireties.

BACKGROUND

The present disclosure relates generally to scratch-resistant glass articles, and more particularly to glass substrates having a scratch-resistant layer formed over a major surface of the substrate.

Scratches are a concern for glass cover applications in hand held devices and other devices such as monitors and other displays. Scratches increase the scattering of light and can reduce the brightness and contrast of images and text that is presented on such screens. Further, in the device-off state, scratches can make the display look hazy, marred and unattractive. In particular for displays and handheld devices, scratch resistance can be an important attribute.

Scratches can be characterized by their depth as well as their width. Deep scratches extend at least 2 microns into the surface of the material, and wide scratches are more than 2 microns wide. Due to the physical extent of the scratch, fragmentation or chipping typically accompanies deep and/or wide scratches. In brittle solids, though, such as glass substrates, the resistance to deep and wide scratches can be improved through optimization of glass chemistry, i.e., glass composition.

On the other hand, scratches can also be shallow and/or narrow. Shallow scratches are characterized by a depth of less than 2 microns, and narrow scratches are characterized by a width of less than 2 microns. Scratches at these dimensional scales are sometimes described as "microductile" scratches. In displays and handheld devices, where a glass cover can be formed from an oxide glass, a large fraction of the scratches accumulated during use are believed to be microductile scratches. Though microductile scratches are not typically associated with large volumes of fragmented or chipped material, microductile scratches can adversely affect the optical properties of a glass cover. Further, in contrast to the larger, "heavy" scratches, microductile scratches are not easily prevented through modification of the glass chemistry.

The formation of microductile scratches can be attenuated by adjusting the hardness of the surface that is being scratched. Harder surfaces typically are more resistant to microductile scratching. While oxide glasses that form the glass substrates used in many glass covers typically have hardness values in the range of 6 to 9 GPa, as disclosed herein, the propensity of microductile scratch formation can be dramatically decreased by forming a hard surface layer on the oxide glass where the surface layer has a hardness value greater than 9 GPa.

In view of the foregoing, it would be desirable to provide a hard, scratch-resistant coating that can be applied to rigid glass covers that is economical, optically transparent and physically and chemically compatible with the underlying glass sheet.

SUMMARY

Disclosed herein are methods for forming a scratch-resistant glass article. An embodiment of the method comprises providing a chemically-strengthened glass substrate having opposing major surfaces, and while heating the glass substrate to a temperature less than 500° C., forming an inorganic, optically-transparent layer over a majority of a first major surface. By limiting the temperature of the substrate to less than 500° C. or less than 300° C. during formation of the inorganic layer, the stress distribution profile within the chemically-strengthened glass can be preserved.

The inorganic layer can be formed using reactive or non-reactive sputtering, though other physical vapor deposition or chemical vapor deposition processes can be used. Suitable process times for forming the inorganic layer, which can range in total thickness from 10 nm to 3 microns, can range from 1 minute to several hours. The glass substrate can be substantially planar and can have a thickness ranging from about 100 microns to 5 mm.

In embodiments the inorganic layer is a contiguous, uninterrupted layer formed over a major surface of the substrate. The inorganic layer may be formed in direct contact with the substrate or, alternatively, one or more layers such as stress-relief layers, anti-reflective layer or adhesion-promoting layers may be formed between the inorganic layer and the substrate.

A scratch-resistant glass article formed using the disclosed methods comprises a chemically-strengthened glass substrate having opposing major surfaces, and an inorganic, optically-transparent layer formed over a majority of a first major surface of the substrate.

The inorganic layer may comprise an oxide layer such as an aluminum oxide layer or a zirconium oxide layer, though other transition metal oxides may be used. Further, the inorganic layer may also comprise a metal nitride, a metal carbide and/or a metal boride. Example metals for an oxide, nitride, carbide or boride inorganic layer include boron, aluminum, silicon, titanium, vanadium, chromium, yttrium, zirconium, niobium, molybdenum, tin, hafnium, tantalum and tungsten.

The inorganic layer can have a hardness that is greater than (e.g., at least 10% greater than) the hardness of the substrate. For example, the inorganic layer can have a Berkovich indenter hardness of at least 9 GPa. The inorganic layer can be under a state of compressive stress.

The glass substrate can be used, for example, as cover glass in a variety of different devices, including touch screen and passive displays. As such, the inorganic layer can be optically clear (e.g., water clear) and transparent. In embodiments, the inorganic layer has a refractive index over the visible spectrum of less than about 3, e.g., from about 1.4 and 2, and a maximum reflectance over the visible spectrum of less than 40%. The inorganic layer can be substantially free of scratches, including microductile scratches.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

A method for forming a scratch-resistant glass article comprises providing a chemically-strengthened glass substrate having opposing major surfaces, and forming an inorganic, optically-transparent layer over a majority of a first major surface. To avoid adversely affect the chemical strengthening of the substrate, the act of forming comprises heating the glass substrate to a maximum temperature of 500° C. The temperature of the substrate during the act of forming the inorganic layer can range from about −200° C. to 500° C. In embodiments, the substrate temperature is maintained at a temperature between about room temperature and 500° C., e.g., at a temperature of less than 500° C. or less than 300° C. during the formation of the inorganic layer.

The methods disclosed herein address the adverse effect of the chemical strengthening of the glass substrate. The adverse effect on the chemical strengthening of the glass substrate should be distinguished from any adverse or beneficial effect on the properties of the inorganic layer due to process conditions. In one or more embodiments, the adverse effect on the chemical strengthening of the glass substrate may include relaxation of the compressive stress generated in the glass substrate by a chemical strengthening process, as will be discussed in greater detail herein.

Figure 1:
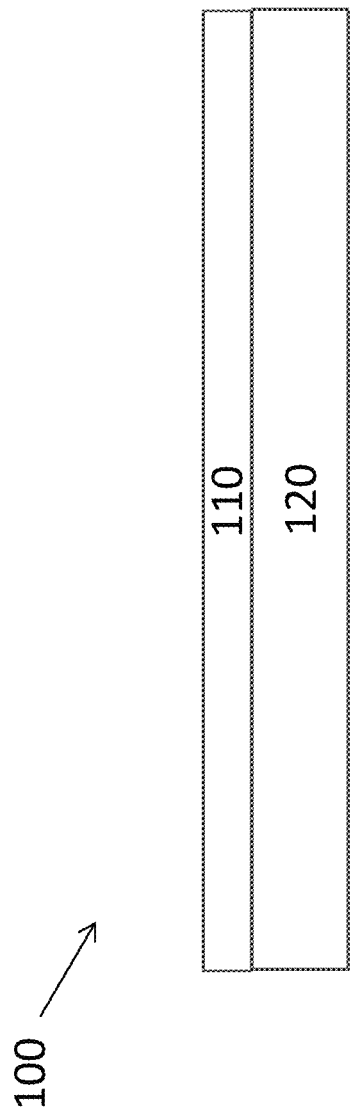
FIG. 1 is a schematic of a scratch-resistant inorganic layer formed over a major surface of a glass substrate.

A scratch-resistant glass article 100 comprising an inorganic layer 110 formed over a glass substrate 120 is shown in FIG. 1.

The glass substrate itself may be provided using a variety of different processes. For instance, example glass substrate forming methods include float processes and down-draw processes such as fusion draw and slot draw.

In the float glass method, a sheet of glass that may be characterized by smooth surfaces and uniform thickness is made by floating molten glass on a bed of molten metal, typically tin. In an example process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

Down-draw processes produce glass sheets having a uniform thickness that possess surfaces that are relatively pristine. Because the strength of the glass surface is controlled by the amount and size of surface flaws, a pristine surface that has had minimal contact has a higher initial strength. When this high strength glass is then chemically-strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

The fusion draw process, for example, uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

The chemically-strengthened glass substrate, in some embodiments, may be batched with 0-2 mol. % of at least one fining agent selected from a group that includes $Na_2SO_4$, NaCl, NaF, NaBr, $K_2SO_4$, KCl, KF, KBr, and $SnO_2$.

Once formed, glass substrates may be chemically strengthened by an ion exchange process. In this process, typically by immersion of the glass substrate into a molten salt bath for a predetermined period of time, ions at or near the surface of the glass are exchanged for larger metal ions from the salt bath. In one embodiment, the temperature of the molten salt bath is about 430° C. and the predetermined time period is about eight hours. The incorporation of the larger ions into the glass strengthens the substrate by creating a compressive stress in a near surface region. A corresponding tensile stress is induced within a central region of the glass to balance the compressive stress.

In one example embodiment, sodium ions in the chemically-strengthened glass can be replaced by potassium ions from the molten bath, though other alkali metal ions having larger atomic radii, such as rubidium or cesium, can replace smaller alkali metal ions in the glass. According to particular embodiments, smaller alkali metal ions in the glass can be replaced by $Ag^+$ ions. Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t-2DOL}{DOL}\right)$$

where t is the total thickness of the glass sheet and DOL is the depth of exchange, also referred to as depth of layer.

In one embodiment, a chemically-strengthened glass sheet can have a surface compressive stress of at least 300 MPa, e.g., at least 400, 450, 500, 550, 600, 650, 700, 750 or 800 MPa, a depth of layer at least about 20 μm (e.g., at least about 20, 25, 30, 35, 40, 45, or 50 μm) and/or a central tension greater than 40 MPa (e.g., greater than 40, 45, or 50 MPa) but less than 100 MPa (e.g., less than 100, 95, 90, 85, 80, 75, 70, 65, 60, or 55 MPa).

Example ion-exchangeable glasses that may be used as the glass substrate are alkali aluminosilicate glasses or alkali aluminoborosilicate glasses, though other glass compositions are contemplated. As used herein, "ion exchangeable" means that a glass is capable of exchanging cations located at or near the surface of the glass with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass substrate includes at least 6 wt. % aluminum oxide. In a further embodiment, a glass substrate includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass substrate can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for the glass substrate comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O_3 + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O_3 + B_2O_3}{\sum \text{modifiers}} > 1.$$

In another embodiment, an alkali aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In yet another embodiment, an alkali aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $\leq Li_2O+Na_2O+K_2O \leq 20$ mol. % and 0 mol. % $\leq MgO+CaO \leq 10$ mol. %.

In still another embodiment, an alkali aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO > 10$ mol. %; 5 mol. % $\leq MgO+CaO+SrO \leq 8$ mol. %; $(Na_2O+B_2O_3) - Al_2O_3 \leq 2$ mol. %; 2 mol. % $\leq Na_2O - Al_2O_3 \leq 6$ mol. %; and 4 mol. % $\leq (Na_2O+K_2O) - Al_2O_3 \leq 10$ mol. %.

The glass substrate can have a thickness ranging from about 100 microns to 5 mm. Example substrate thicknesses range from 100 microns to 500 microns, e.g., 100, 200, 300, 400 or 500 microns. Further example substrate thicknesses range from 500 microns to 1000 microns, e.g., 500, 600, 700, 800, 900 or 1000 microns. The glass substrate may have a thickness greater than 1 mm, e.g., about 2, 3, 4, or 5 mm.

The inorganic layers can be formed by chemical vapor deposition (e.g., plasma enhanced chemical vapor deposition), physical vapor deposition (e.g., sputter deposition or laser ablation) or thermal evaporation of a suitable starting material directly onto a glass substrate. Sputtering processes may include reactive sputtering or non-reactive sputtering. A single-chamber sputter deposition apparatus 200 for forming such inorganic layers is illustrated schematically in FIG. 2.

The apparatus 200 includes a vacuum chamber 205 having a substrate stage 210 onto which one or more glass substrates 212 can be mounted, and a mask stage 220, which can be used to mount shadow masks 222 for patterned deposition of an inorganic layer onto a defined region of a substrate. The chamber 205 is equipped with a vacuum port 240 for controlling the interior pressure, as well as a water cooling port 250 and a gas inlet port 260. The vacuum chamber can be cryo-pumped (CTI-8200/Helix; MA, USA)

and is capable of operating at pressures suitable for both evaporation processes (~$10^{-6}$ Torr) and RF sputter deposition processes (~$10^{-3}$ Torr).

Figure 2:
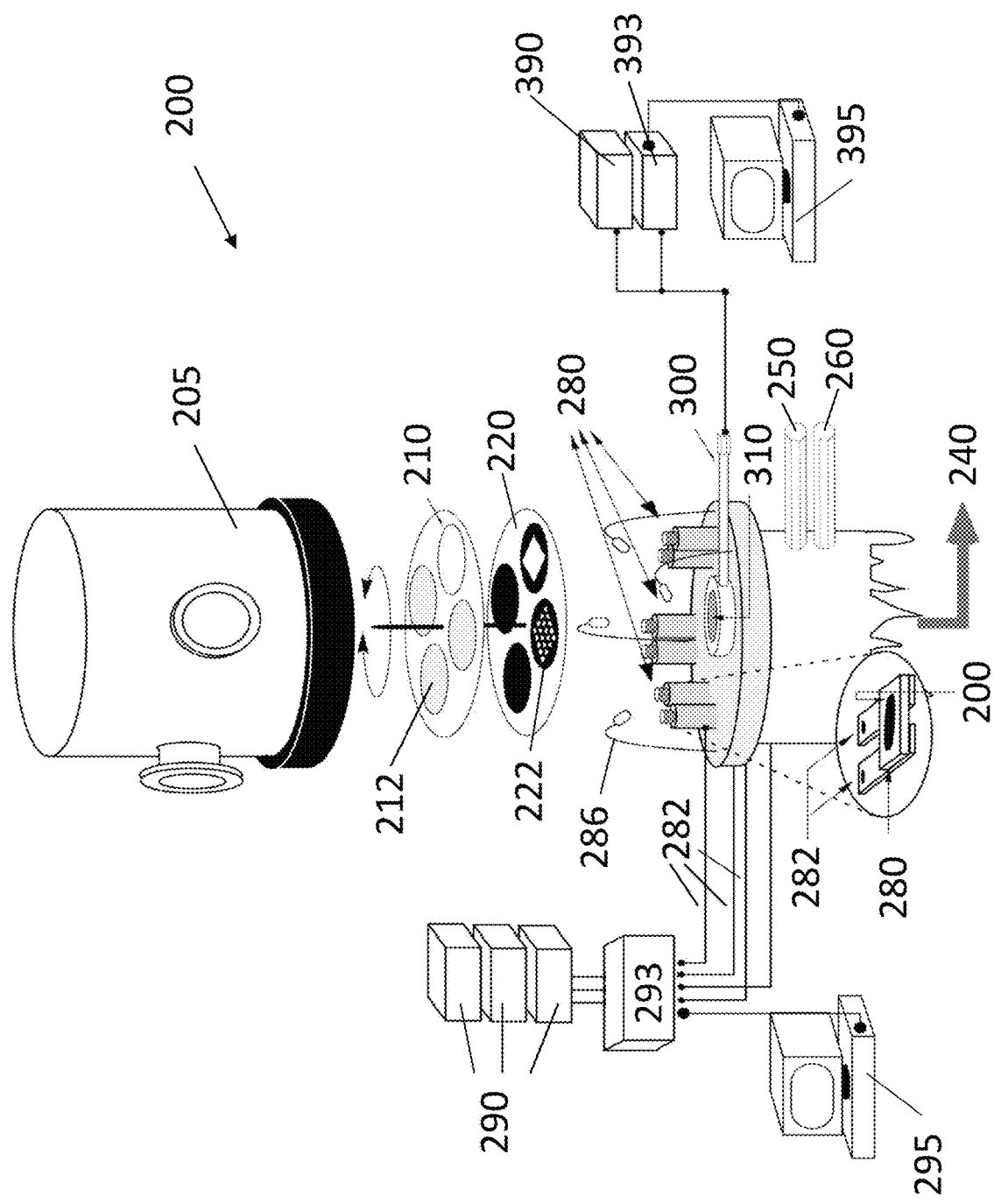
FIG. 2 is a schematic diagram of a single chamber sputter tool for forming inorganic, scratch-resistant layers on glass substrates.

As shown in FIG. 2, multiple evaporation fixtures 280, each having an optional corresponding shadow mask 222 for evaporating material onto a glass substrate 212 are connected via conductive leads 282 to a respective power supply 290. A starting material 200 to be evaporated can be placed into each fixture 280. Thickness monitors 286 can be integrated into a feedback control loop including a controller 293 and a control station 295 in order to affect control of the amount of material deposited.

In an example system, each of the evaporation fixtures 280 are outfitted with a pair of copper leads 282 to provide DC current at an operational power of about 80-180 Watts. The effective fixture resistance will generally be a function of its geometry, which will determine the precise current and wattage.

An RF sputter gun 300 having a sputter target 310 is also provided for forming a layer of inorganic material (e.g., metal oxide, nitride, carbide or boride) on a glass substrate. The RF sputter gun 300 is connected to a control station 395 via an RF power supply 390 and feedback controller 393. For sputtering inorganic layers, a water-cooled cylindrical RF sputtering gun (Onyx-3™, Angstrom Sciences, Pa) can be positioned within the chamber 105. Suitable RF deposition conditions include 50-150 W forward power (<1 W reflected power), which corresponds to a typical deposition rate of about ~5 Å/second (Advanced Energy, Co, USA). In embodiments, the sputtering rate can vary between 0.1 and 10 angstroms per second, for example.

To avoid adversely affect the chemical strengthening of the glass substrate, the deposition temperature, processing pressure and/or deposition time utilized to form the layer of inorganic material may be controlled. In one or more embodiments, the deposition time may be controlled to a time in the range from about 1 minute to about 600 minutes, from about 10 minutes to about 600 minutes, from about 30 minutes to about 500 minutes, from about 100 minutes to about 400 minutes, from about 200 minutes to about 300 minutes, and all ranges and sub-ranges therebetween. In one variant, the pressure at which the layer of inorganic material is formed or the processing pressure may be controlled to between about 0.1 mTorr and 100 Torr, from about 0.1 mTorr to about 100 mTorr and all ranges and sub-ranges therebetween. In another variant, the temperature at which the layer of inorganic material is formed may be controlled to a temperature less than about 300° C.

In one or more embodiments, one, two or three of the processing conditions of deposition time, pressure and deposition temperature may be controlled. With respect to deposition temperature, it is noted that in some embodiments, the deposition time does not need to be limited where the deposition temperature is maintained at less than about 300° C. For example, at such temperatures, the deposition process may continue for several minutes to several hours depending on the type of deposition process utilized. For some sputtering processes, the deposition time may last several hours when the deposition temperature is controlled to less than about 300° C. At these temperatures, the compressive stress generated in the glass substrate (and any corresponding central tension present in the central region of the glass substrate) is not significantly affected.

When deposition temperatures of 300° C. and above (e.g., 400° C. and above or even 500° C. and above) are utilized, the deposition time may need to be limited to a few minutes or even a few seconds before the chemical strengthening of the glass substrate begins to be adversely affected. The adverse effect may be seen even when the total deposition time is a few minutes or a few seconds. Total deposition time includes the time at which the glass substrate is exposed to deposition temperatures, including in deposition recipes in which deposition is interrupted such that the glass substrate is no longer exposed to deposition temperatures (e.g., by removing the glass substrate from a deposition chamber or otherwise cooling the deposition chamber to temperatures below about 300° C.). The time during which the glass substrate is not exposed to deposition temperatures is not included in the total deposition time. It is believed that the adverse effect to the chemical strengthening of the glass substrate is due, at least in part, to the diffusion promoted within the glass substrate as a result of the elevated deposition temperatures. The elevated deposition temperatures increase ion mobility in the glass substrate and thus, can cause the larger ions present at the surface of the glass substrate to layer to migrate, thus adversely affecting the compressive stress in the surface of the glass substrate.

The inorganic layer may comprise a metal oxide layer, a metal nitride layer, a metal carbide layer or a metal boride layer. Example metals for such an oxide, nitride, carbide or boride layer include boron, aluminum, silicon, titanium, vanadium, chromium, yttrium, zirconium, niobium, molybdenum, tin, hafnium, tantalum and tungsten. Non-limiting example inorganic layers include aluminum oxide and zirconium oxide layers.

A thickness of the inorganic layer can range from 10 nm to 3 microns. For example, the average inorganic layer thickness can be about 10, 20, 50, 100, 200, 300, 400, 500, 600, 700, 800, 900, 1000, 1500, 2000 nm, 2500 nm, 3000 nm and all ranges and sub-ranges therebetween.

The inorganic layer can have a hardness that is greater than (e.g., at least 10% greater than) the hardness of the substrate. For instance, the inorganic layer hardness can be at least 10, 20, 30, 40 or 50% greater than the substrate hardness. An example inorganic layer can have a Berkovich indenter hardness of at least 9 GPa. The inorganic layer can be under a state of compressive stress. As mentioned herein, in some instances, the compressive stress of the inorganic layer is independent of the compressive stress of the underlying glass substrate and/or of the effects to the compressive stress of the underlying glass substrate due to the process utilized to form the inorganic layer.

The properties of the inorganic layer may be altered depending on the temperature(s) at which it is formed or deposited on the glass substrate. For example, when layers such as the inorganic layer are deposited at high temperatures, impurities that may be found in such layers or in the precursor materials utilized to form the layers may be driven off. The higher temperature(s) may also cause any voids in the layer to fill, which can lead to a more dense film. This is because the atoms deposited onto the glass substrate to form the layer (e.g., the inorganic layer) have greater surface mobility and can move to fill in such voids. On the other hand, when the surface of the glass substrate is cold or unheated, the atoms deposited onto the glass substrate to form the layer (e.g., the inorganic layer) have less mobility and therefore do not as readily fill voids in the formed layer. The resulting layer formed at lower temperatures is therefore less dense. As will be discussed, although lower temperatures are utilized to form the inorganic layer of the embodiments described herein, the resulting inorganic layer still imparts the requisite scratch resistance or other properties, while the glass substrate retains its strength due to chemical strengthening.

The inorganic layer can be CTE-matched with the chemically-strengthened glass substrate. In embodiments, the inorganic layer has a coefficient of thermal expansion that differs from the coefficient of thermal expansion of the glass substrate by at most 10%, e.g., the CTE difference is less than 10, 5, 2 or 1%.

According to various embodiments, a scratch-resistant glass substrate may possess an array of properties, which may include low weight, high impact resistance, and high optical transparency.

The optical properties of the inorganic layer can be tailored to minimize scattering and absorption of light, which can result in a high optical-quality glass article. In applications where the glass substrate is used as display cover glass, the inorganic layer can be optically clear (e.g., water clear) and optically transparent. For example, the inorganic layer can have a refractive index within the visible spectrum of less than about 3, e.g., from about 1.4 to 2, and a reflectance within the visible spectrum of less than 40%, e.g., less than 40, 30, 20, 10 or 5%. For instance, the inorganic layer can transmit 95% or more of incident light, e.g., at least 95, 96, 97, 98 or 99%. The inorganic layer can be substantially free of scratches, including microductile scratches.

Figure 3:
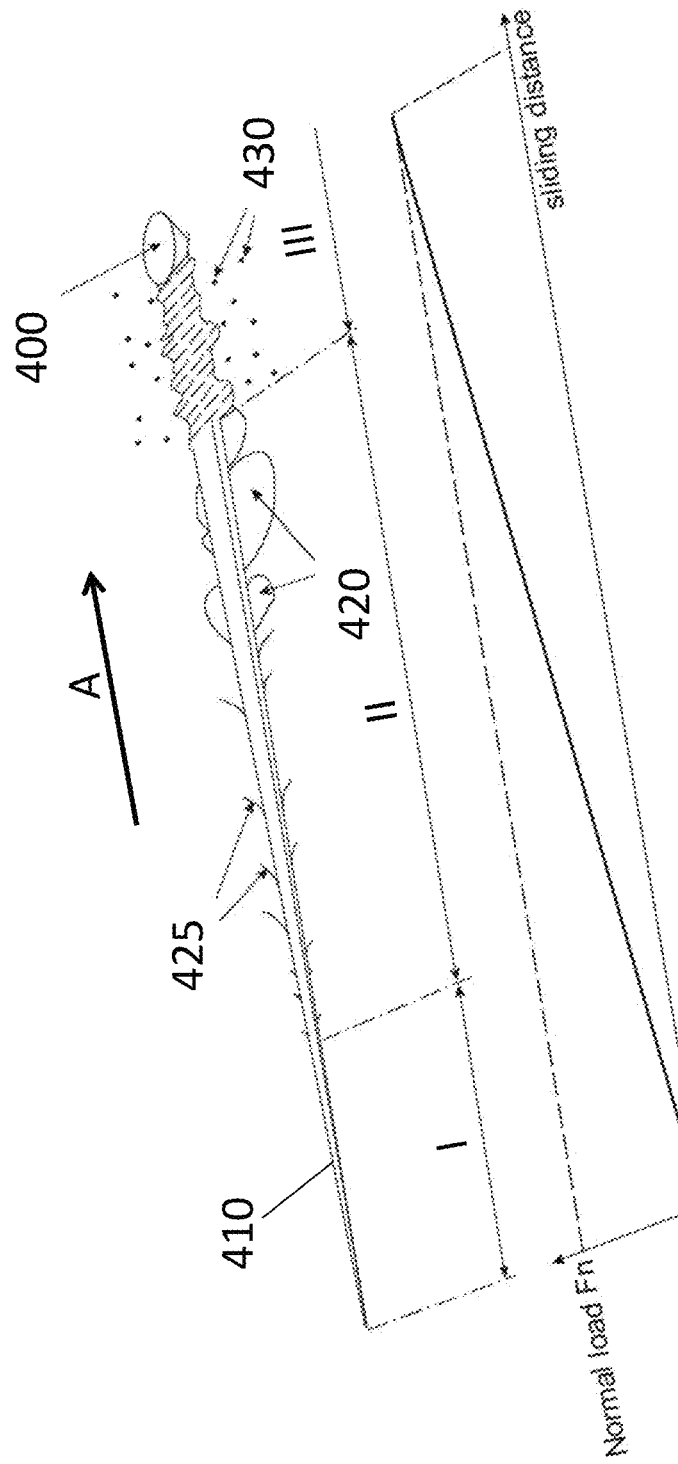
FIG. 3 is a schematic showing scratch formation in a glass surface under monotonic loading cycle.

The loading cycle applied during scratch-resistance testing typically gives rise to three different response regimes. The scratch pattern made on a glass surface as a function of applied load is shown schematically in FIG. 3. Arrow A in FIG. 3 indicates the direction of scratching. The first regime is the micro-ductile regime (I), which corresponds to plastic deformation under the indenter 400 and the appearance of a permanent groove 410. In this first regime, sub-surface lateral cracks may also appear. A characteristic of the micro-ductile regime is the absence of damage or debris on either side of the groove 410. The second regime (II), which is encountered when the load increases, is called the micro-cracking regime. Chip and fragment 420 formations occur in the micro-cracking regime as a consequence of the intersection of lateral cracks with the surface. Radial (chevron) cracks 425 may also form in the micro-cracking regime. Such cracking can dramatically affect the optical transparency of the glass. The third regime (III) is termed the micro-abrasive regime, and is characterized by the formation of bulk debris 430.

In experiments with oxide coatings, for example, a marked improvement in the scratch resistance toward micro-ductile scratches was achieved for inorganic layer-coated chemically-strengthened glass substrates in comparison with non-chemically-strengthened and chemically-strengthened glass of the same base composition.

In one set of experiments, thin aluminum oxide layers were deposited via RF magnetron sputtering from an aluminum oxide target onto chemically-strengthened glass substrates. The substrate temperature was held between 100 and 300° C. during the deposition and the final oxide layer thickness was about 200 nm. The deposition rate varied between 0.01 and 1 nm/sec.

Figure 4:
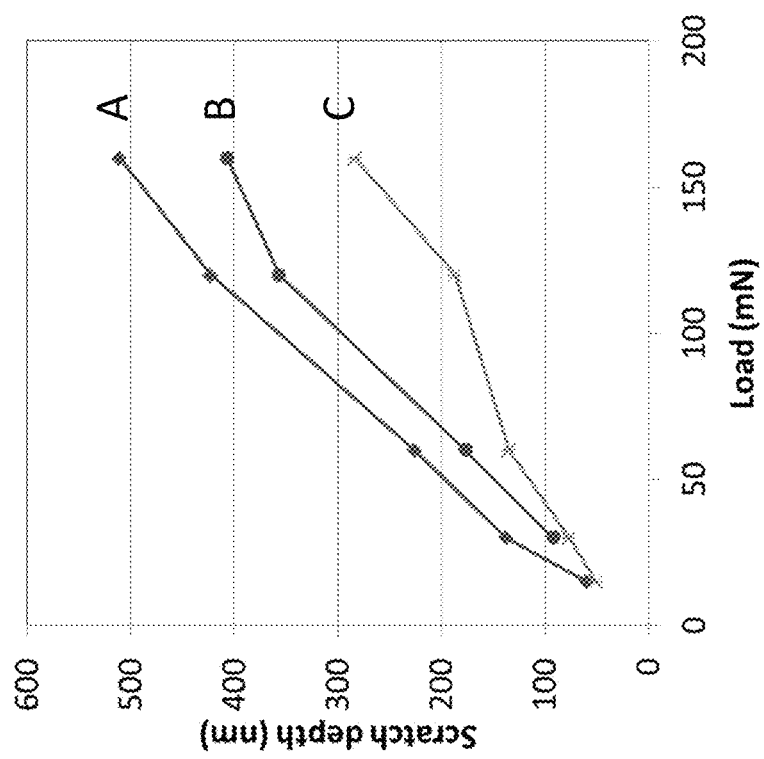
FIG. 4 is a plot of scratch depth versus load for (A) an as-formed alkali aluminosilicate glass substrate, (B) a chemically-strengthened alkali aluminosilicate glass substrate, and (C) an aluminum oxide-coated, chemically-strengthened alkali aluminosilicate glass substrate.

An increase in scratch resistance was correlated to a reduction in the scratch depth for the protected glass substrate. As measured using a diamond-tipped Berkovich indenter, the scratch depth for the glass substrate having the inorganic protective layer was significantly reduced. A plot of scratch depth versus applied load is shown in FIG. 4 for (A) an un-chemically-strengthened glass substrate, (B) a chemically-strengthened glass substrate, and (C) a chemically-strengthened glass substrate having an inorganic layer formed over the tested surface of the substrate. Compared to the chemically-strengthened glass substrate without the inorganic protective layer, the addition of the inorganic protective layer reduced the scratch depth by as much as 25%. By way of example, the formation of the inorganic layer of a surface of the glass substrate can reduce the scratch depth in such a sample (compared to an otherwise equivalent but unprotected glass substrate) by at least 10%, e.g., greater than 10, 20, 30, 40 or 50%.

In addition to the disclosed method, also disclosed is a scratch-resistant glass article made using the method. The glass article comprises a chemically-strengthened glass substrate and an inorganic, optically-transparent layer formed over a majority of one major surface of the substrate. The inorganic layer can substantially enhance the scratch resistance of the glass surface while maintaining the overall optical clarity of the article.

Technologies that incorporate glass articles that may benefit from scratch resistance include military and civilian optics, including watch crystals, scanner windows at grocery stores, scanner windows on photocopiers, and LCD screen protectors, hard disk memory surfaces, piston rings in engines, machine tools, and other moving and sliding components.

A mobile electronic device comprising a cover plate, at least a portion of which is transparent, is also disclosed. Such mobile electronic devices include, but are not limited to, mobile communication devices such as personal data assistants, mobile telephones, pagers, watches, radios, laptop computers and notebooks, and the like. As used herein, a "cover plate" refers to a glass sheet or window that covers a visual display. At least a portion of the cover plate is transparent to allow viewing of the display. The cover plate may to some extent be resistant to shock, breakage, and scratching and finds application in those electronic devices where a window having high surface strength, hardness, and scratch resistance is desirable. In one embodiment, the cover plate is touch sensitive.

Figure 5:
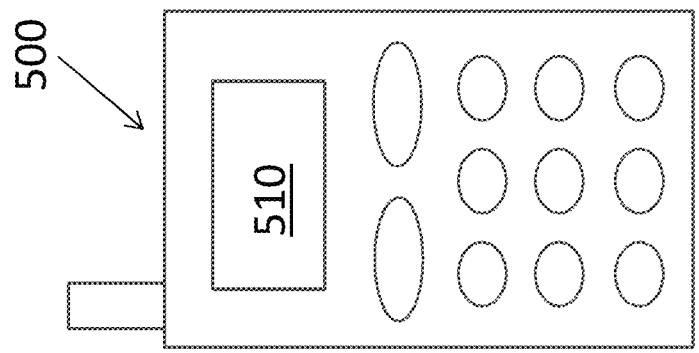
FIG. 5 is a top view of a mobile electronic device having a cover plate formed of a scratch-resistant glass according to various embodiments.

A schematic representation of a top view of a mobile telephone is shown in FIG. 5. Mobile telephone 500 includes a cover plate 510 comprising a scratch-resistant, chemically-strengthened glass as described herein. In mobile telephone 500, cover plate 510 serves as a display window. During formation of the cover plate, a sheet of down-drawn glass can be cut to the desired shape and size. Before or after sizing the cover plate, the glass sheet may be strengthened by ion exchange, and then provided with an inorganic, scratch-resistant layer over an exposed surface of the glass. The cover plate may then be joined to the body of the mobile electronic device using an adhesive or other means known in the art.

A cover plate for a device such as, but not limited to, the mobile electronic devices described above as well as non-electronic watches and other like, is also provided. The cover plate may be formed from any of the glass compositions disclosed herein above.

As used herein, the singular forms "a," "an" and "the" include plural referents unless the context clearly dictates otherwise. Thus, for example, reference to a "layer" includes examples having two or more such "layers" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

EXAMPLES

Various embodiments will be further clarified by the following examples.

Example 1

Four samples each were prepared according to Example 1 and Comparative Example 2. The four samples according to Example 1 were prepared by providing a chemically strengthened glass substrate having opposing major surfaces and depositing an inorganic layer on one surface comprising aluminum nitride via ion beam sputtering process. The resulting inorganic layer formed on each of the four samples according to Example 1 had a thickness of about 1.175 μm. The deposition temperature was maintained at about 160° C. and the pressure was maintained at 0.588 mTorr.

The inorganic layer was sputtered from a target in the presence of argon flowed at a rate of about 75 sccm, with DC power supplied at 3.9 kW. The ion beam was generated at a power in the range from about 0.224 kW to about 0.196 kW using a mixture of nitrogen and argon gases.

Four samples each of Comparative Example 2 were prepared by providing four chemically-strengthened glass substrates having the same compressive stress and compressive stress layer thicknesses as the chemically strengthened glass substrates utilized in the samples of Example 1.

Each of the samples of Example 1 and Comparative Example 2 were scratched at four different loads using a Berkovich indenter. For the samples of Example 1, the side of the glass substrate including the inorganic layer was scratched. The width and depth of the scratch on each of the samples were measured and are provided in Table 1.

TABLE 1

Scratch loads and width and depth measurements.

| Sample | | Width (μm) | Depth (nm) | Width Reduction | Depth Reduction |
|---|---|---|---|---|---|
| Example 1 | 1 (160 mN load) | 4.42 | 145 | 12% | 23% |
| Comparative Example 2 | 1 (160 mN load) | 5.05 | 189 | | |
| Example 1 | 2 (120 mN load) | 3.71 | 130 | 22% | 20% |
| Comparative Example 2 | 2 (120 mN load) | 4.74 | 163 | | |
| Example 1 | 3 (60 mN load) | 2.45 | 65 | 26% | 40% |
| Comparative Example 2 | 3 (60 mN load) | 3.33 | 108 | | |
| Example 1 | 4 (30 mN load) | 0.95 | 33 | 57% | 45% |
| Comparative Example 2 | 4 (30 mN load) | 2.21 | 60 | | |

Figure 6:
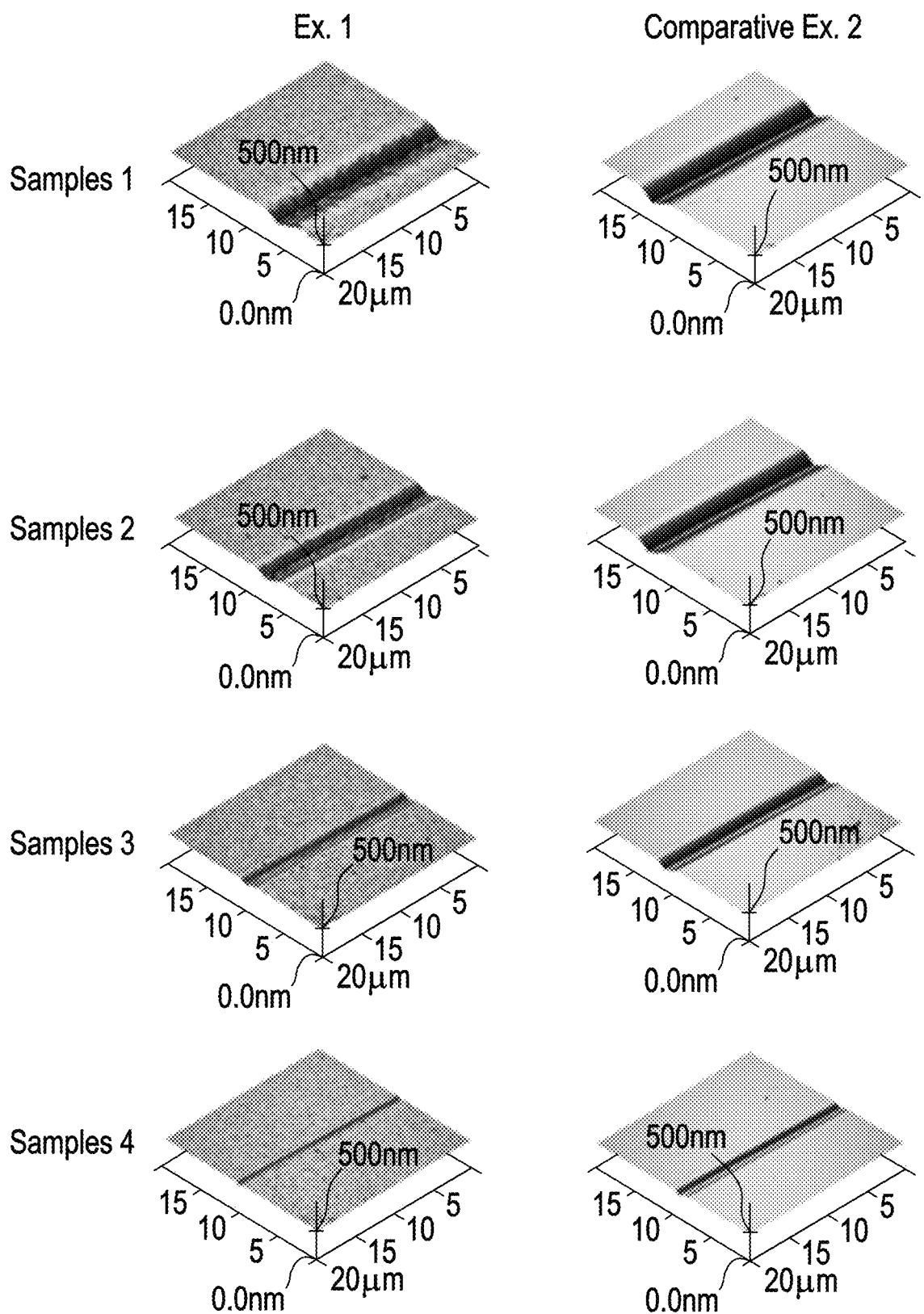
FIG. 6 illustrates the scratch depth and width reduction of glass substrates according to one or more embodiments in comparison to bare glass substrates.

FIG. 6 shows an atomic force microscopy (AFM) of the samples of Example 1 and Comparative Example 2, after each sample was scratched. As can be seen, there is significant reduction in scratch depth and width in the samples that included in the inorganic layer formed on the glass substrate, even with such layer was formed at temperatures below about 300° C. The chemical strengthening of the glass substrates according to Example 1 was also maintained or, in other words, was not adversely affected.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a glass substrate that comprises a glass material include embodiments where a glass substrate consists of a glass material and embodiments where a glass substrate consists essentially of a glass material.

It will be apparent to those skilled in the art that various modifications and variations can be made to the present disclosure without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A method for forming a scratch-resistant glass article comprising:
    providing a glass substrate having opposing major surfaces; and
    forming an inorganic, optically-transparent layer over a majority of one of the major surfaces, wherein the forming comprises heating the glass substrate to a temperature of less than 300° C. and the glass substrate comprises chemically-strengthened glass with a surface compressive stress of at least 300 MPa,
    wherein the inorganic layer is formed using a deposition time of between about 1 and 600 min,
    wherein the inorganic layer is formed using a processing pressure of between about 0.1 mTorr and 100 Torr, and
    further wherein the surface compressive stress is not significantly reduced by the step of forming the inorganic, optically-transparent layer.

2. The method according to claim 1, wherein the forming comprises reactive or non-reactive sputtering, e-beam evaporation, chemical vapor deposition or plasma enhanced chemical vapor deposition.

3. The method according to claim 1, wherein the inorganic layer has a thickness ranging from about 10 nm to 3 microns.

4. The method according to claim 1, wherein the inorganic layer is a contiguous layer.

5. The method according to claim 1, wherein the inorganic layer is formed in direct physical contact with the glass substrate.

6. The method according to claim 1, wherein one or more of an adhesion-promoting layer, anti-reflective layer and a stress-reduction layer are formed between the glass substrate and the inorganic layer.

7. The method according to claim 1, wherein the glass substrate has a thickness ranging from about 100 microns to 5 mm.

* * * * *

UNITED STATES PATENT AND TRADEMARK OFFICE
CERTIFICATE OF CORRECTION

PATENT NO. : 10,730,788 B2
APPLICATION NO. : 15/681639
DATED : August 4, 2020
INVENTOR(S) : Charles Andrew Paulson et al.

It is certified that error appears in the above-identified patent and that said Letters Patent is hereby corrected as shown below:

On the Title Page

On page 2, in Column 2, item (56), Other Publications, Line 1, delete "Actioon" and insert -- Action --, therefor.

Signed and Sealed this
Twenty-eighth Day of June, 2022

Katherine Kelly Vidal
*Director of the United States Patent and Trademark Office*